A. W. LIEBERMAN.
SELF PROPELLED RAILWAY CAR.
APPLICATION FILED NOV. 28, 1921.
1,411,363.
Patented Apr. 4, 1922.
3 SHEETS—SHEET 1.
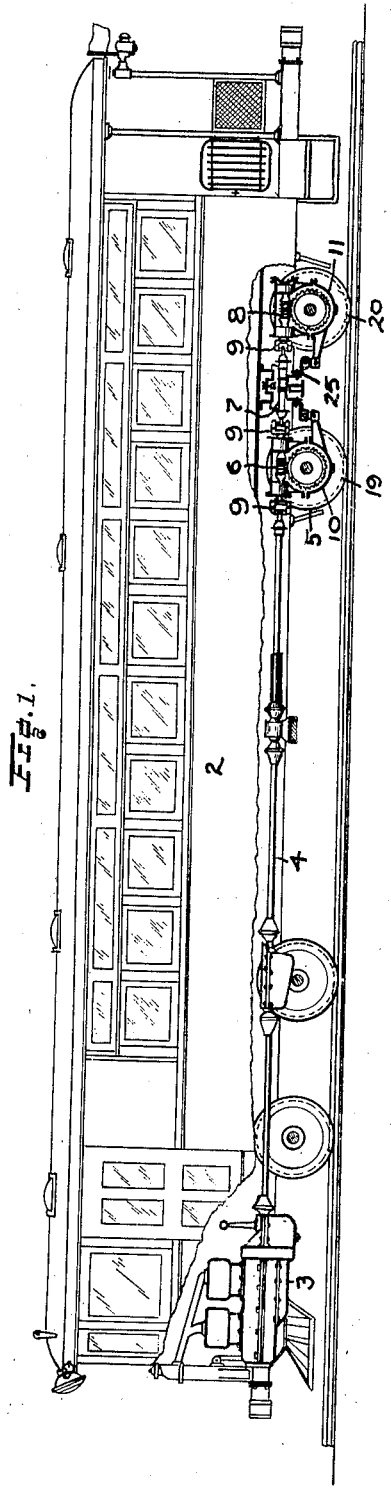
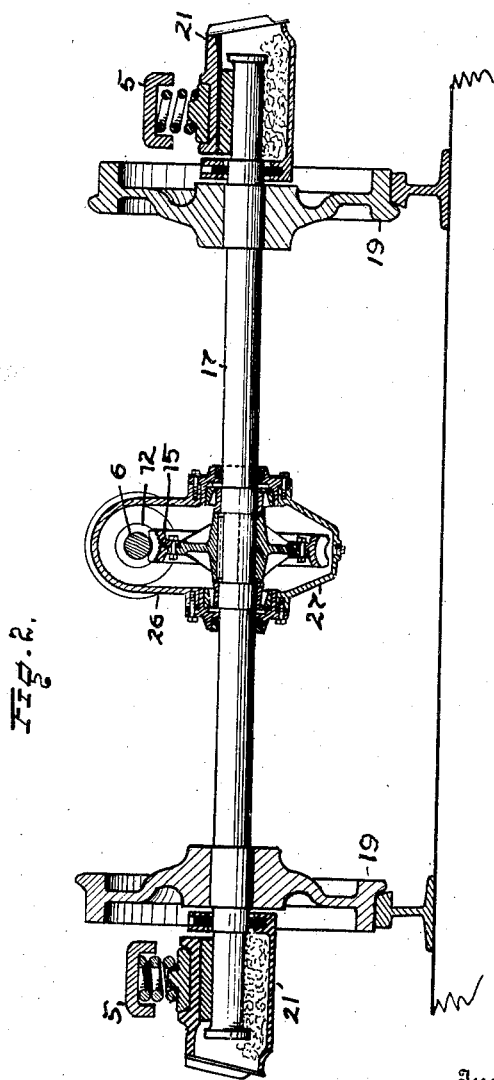
Inventor
A. W. LIEBERMAN
By Fisher, Moser & Moore
Attorneys

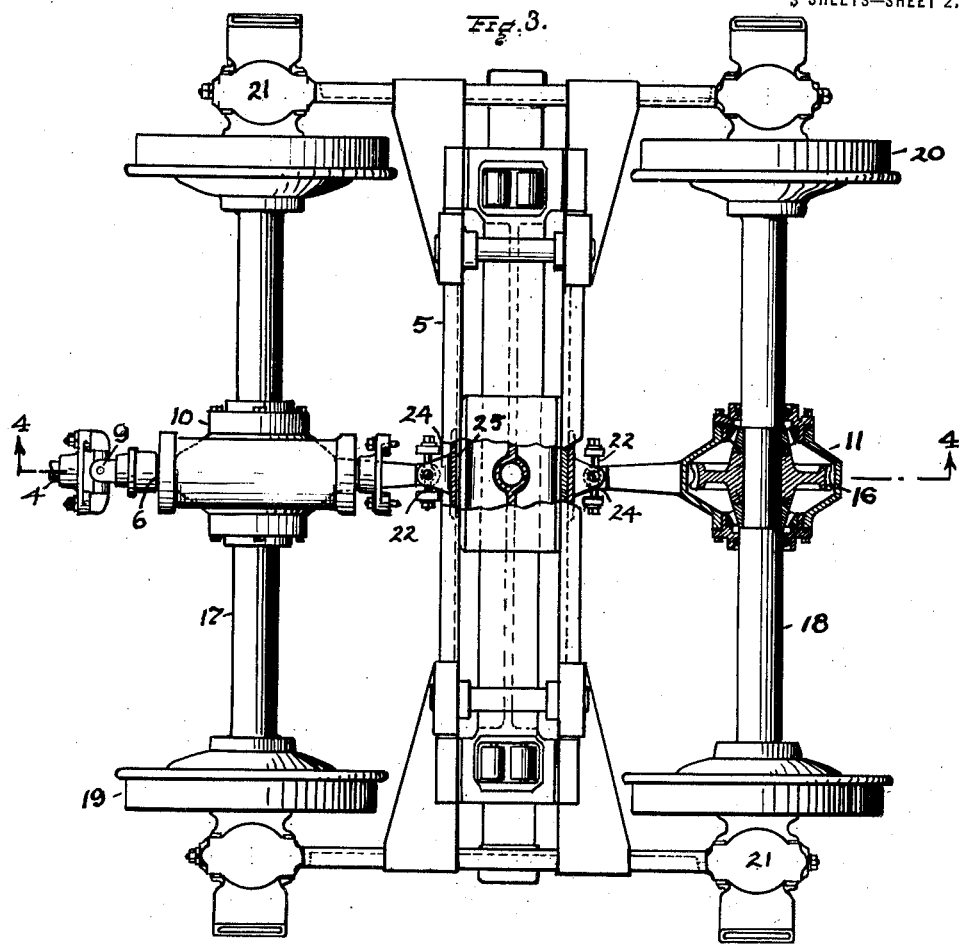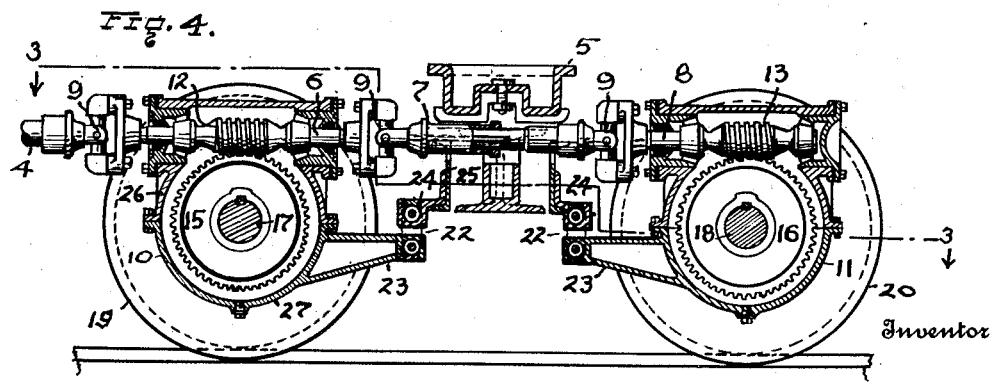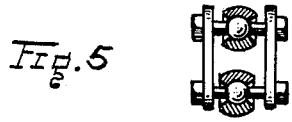

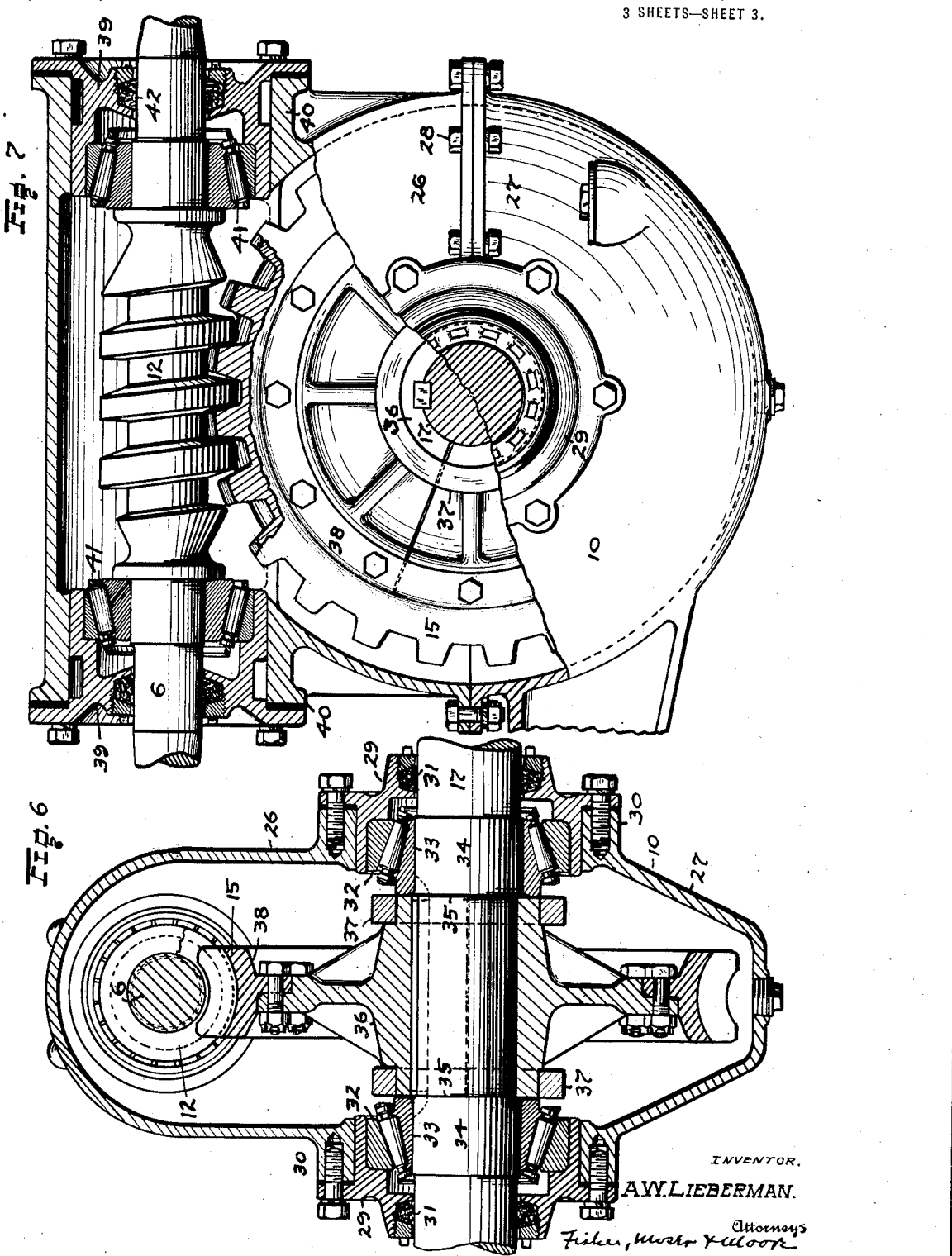

UNITED STATES PATENT OFFICE.

ADOLPH W. LIEBERMAN, OF CLEVELAND, OHIO.

SELF-PROPELLED RAILWAY CAR.

1,411,363.     Specification of Letters Patent.     Patented Apr. 4, 1922.

Application filed November 28, 1921. Serial No. 518,194.

*To all whom it may concern:*

Be it known that I, ADOLPH W. LIEBERMAN, a citizen of the United States, residing at Cleveland, in the county of Cuyahoga and State of Ohio, have invented certain new and useful Improvements in Self-Propelled Railway Cars, of which the following is a specification.

This invention relates to self-propelled railway cars, for example, gasoline railway cars or other cars operating on tracks and driven by an internal-combustion engine mounted upon a car body or frame swiveled on wheeled trucks. In general, the object of this invention is to provide a practical and efficient truck and power-transmission assembly which will afford a positive drive for both wheel axles of one of the trucks and possess all the necessary flexibility to accommodate the spring action of the truck and the relative shift of the axles in the bearings or boxes in the truck.

In the accompanying drawings, Fig. 1 is a side view of a railway coach or car equipped with this invention, and Fig. 2 is a sectional view on a larger scale, of the truck and transmission on the line of one of the wheel axles. Fig. 3 is a top or plan view of the truck, partly broken away and in section, on line 3—3 of Fig. 4. Fig. 4 is a vertical section on the line of the power transmission in shaft, and corresponding to line 4—4 of Fig. 3. Fig. 5 is a detail view of one of the ball and socket shackles for the torque arm of one of the transmission housings. Figs. 6 and 7 are enlarged views of one of the gear housings and gears therein.

Now, referring to Fig. 1, the coach or car 2 shown is provided with an internal-combustion engine 3 at its front end and a sectional main driving shaft 4 extending lengthwise of the car to truck 5 at its rear end where said shaft is divided into three short sections 6, 7 and 8, coupled together and to the main drive shaft by universal joints 9. Shaft sections 6 and 8 have rotatable bearings within the upper ends of corresponding gear housings 10 and 11, respectively, and comprise worm pinions 12 and 13 meshing with corresponding worm wheels 15 and 16 mounted on the axles 17 and 18 of the driving wheels 19 and 20, respectively, for the car. Each gear housing is free to turn or rotate on its own axle but is fixed against any independent movement longitudinally of the axle in order that the worm pinion and gear therein must always remain in true working relation or mesh. The worm gears and the car wheels are tightly fixed on their respective axles, but the axles themselves are journaled in the boxes or bearings 21 at each side of the truck to permit the shaft and wheels to shift or play back and forth within limits relatively to the truck upon which the car is swiveled, thus permitting the parallel driving axles and wheels to adapt themselves in a measure to the tracks in rounding curves and switches. Consequently the gears and gear housings on the shafts move or shift with the shafts relatively to the truck, but such movements are controlled and limited by a ball and socket shackle or universal coupling 22 attached at the inner end of a torque arm 23 on the bottom half or section of each gear housing and connected to a bracket 24 at each side of the angle-iron cross beam 25 of the truck, see Fig. 4. In applying the power to the axles to turn the wheels in either direction this torque connection absolutely prevents the housing from turning in any great degree independently of the axle, but allows the axle and housing to shift together transversely of the track and relatively to the truck, while also permitting the truck frame perfect freedom in its spring action, it being understood that the bolster or cross beam of the truck is supported by springs in any of the many known ways.

The vertical play of the bolster necessarily raises and lowers the ends of the torque arms 23 and turns the gear housing correspondingly, thus inclining the short worm pinion sections 6 and 8 relatively to a common horizontal line, but the coupling section 7 and its universal joints 9 accommodate this movement of the parts, section 7 being also made in two pieces telescopically united and splined to slide upon each other within limits. This same universal coupling between the shaft sections in the housings also accommodates the longitudinal shifting movements of the two shafts in the journals or bearings as hereinbefore described, and inasmuch as the two torque arms for the housings extend toward each other and are connected to the same bolster or cross beam they equalize the twisting or rotary effect given in applying the power to the driving wheels.

Housings 10 and 11 are constructed alike, that is, each housing comprises separate upper and lower sections 26 and 27, having meeting flanges detachably fastened together by bolts 28, and being further united by flanged collars 29 inset within and bolted to the hub portions 30. Each collar 29 has a packing gland 31 at its outer end surrounding the axle, and a roller bearing ring 32 is seated within its inner recessed end opposite a roller-bearing cone 33 fixed tightly upon the axle or an annular enlargement 34 thereon. Axle 17 is either reduced in diameter or provided with shoulders 35 between the two ball bearing cones 33 thereon, and the gears represented by 15 and 16 have a divided hub member 36 keyed to the axle and seated between said shoulders, see Fig. 6, whereby the end thrust on the axle is distributed alike to the gear and to the housing through the roller-bearing members. Annular rings 37 are sleeved over the opposite ends of divided hub member 36 to supplement the union obtained by bolting gear ring 38 to the rabbeted periphery of this divided hub member. Worm pinion 12 is journaled within the upper section 26, or more properly, within separate collars 39 inset within and bolted to the rounded extensions 40 of said section. Collars 39 are also provided with roller bearing members 41 and packing glands 42 corresponding to collars 29 on the axle, see Fig. 7.

What I claim is—

1. A self-propelled car, comprising a truck having parallel wheel-driving axles journaled loosely therein, power transmission gearing and a housing therefor mounted upon each axle, and a universal torque connection between said housings and the truck.

2. A railway car having a swiveled truck with parallel wheel-driving axles journaled loosely therein, a driving shaft and power-transmitting sections for said axles coupled together for universal movement, a housing fixed upon each axle having journals for said power-transmitting sections, and a torque connection for each housing having freedom of movement to permit said axles with their mounted parts to move independently in their respective truck journals.

3. A self-propelled car having a pair of driving axles, each provided with power transmission and a housing fixed to move longitudinally with the shaft, universal driving couplings for said power transmission, and a torque member for each housing having a holding connection adopted to permit independent shift in position of said housings relatively to each other.

4. A railway car having a swiveled truck with a plurality of driving axles journaled freely within boxes on said truck, an engine and a main driving shaft mounted upon said car having separate driving sections coupled together with universal joints and for extensible movement, separate power-transmitting gearing between each axle and its driving section, a gear housing supporting each driving section in a relatively fixed position upon its corresponding axle, and a flexible torque connection for each housing.

5. A car having an engine and driving shaft mounted thereon, a truck for said car having a plurality of driving wheels and axles, power transmitting mechanism for each axle in universal coupling connections with said driving shaft, and mountings for said mechanism in universal coupling connection with said truck.

6. A car having a swiveled truck, wheel axles journaled in said truck having power transmitting gears fixed thereto, housings for said gears journaled upon said axles and fixed against movement lengthwise thereon, separate driving members for said gears journaled within said housings, an extensible coupling section having universal joints connected with said separate driving members, a driving shaft in universal coupling connection with one of said driving members, and torque equalizing means for said housings.

In testimony whereof I affix my signature in presence of a witness.

ADOLPH W. LIEBERMAN.

Witness:
DOROTHY MOSER.